Aug. 11, 1931.  O. A. ROSS  1,818,933
MAGNETIC CAR RETARDER
Filed Jan. 7, 1928  3 Sheets-Sheet 1
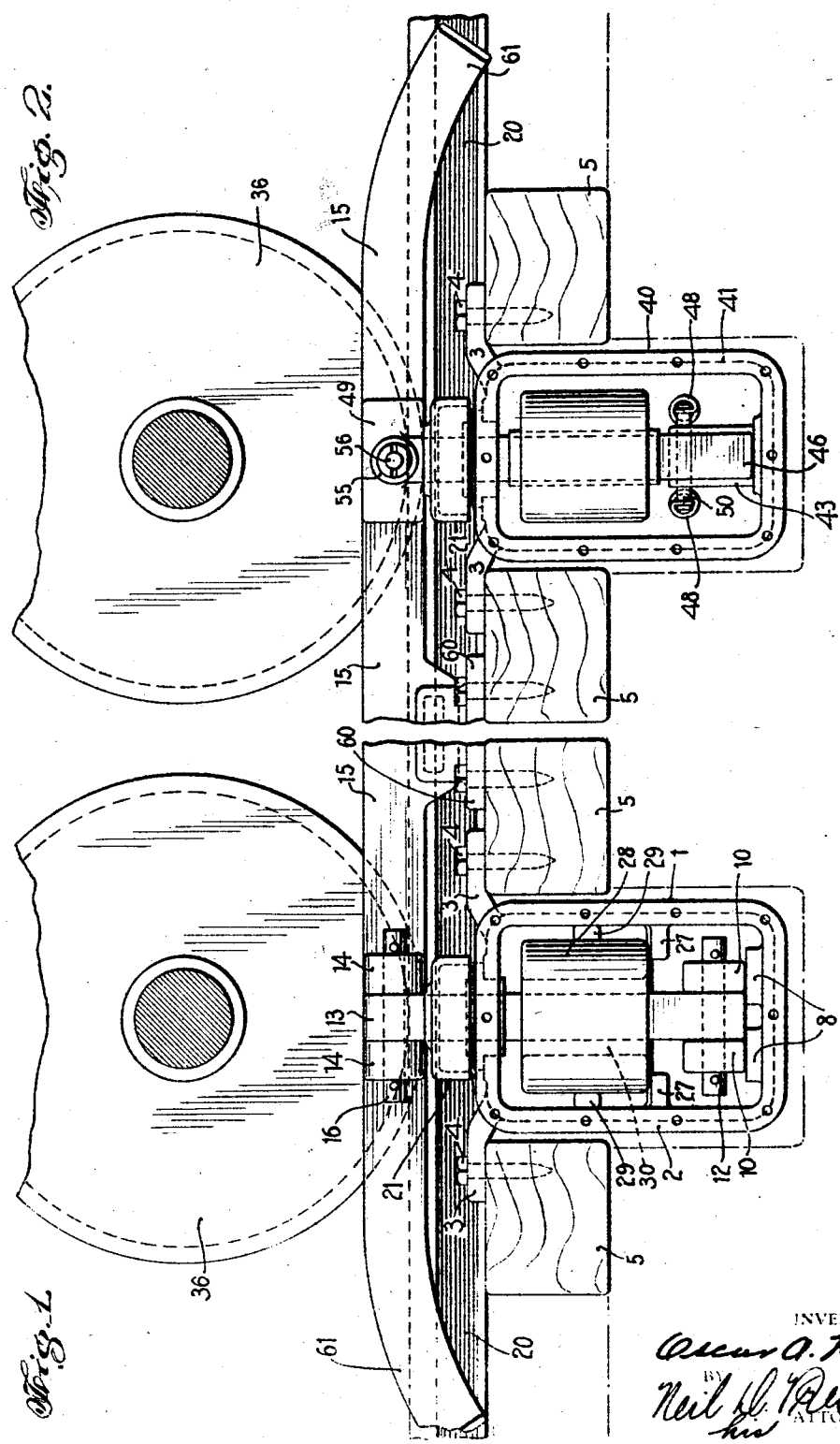
INVENTOR
Oscar A. Ross.
BY Neil D. Paleton
his ATTORNEY

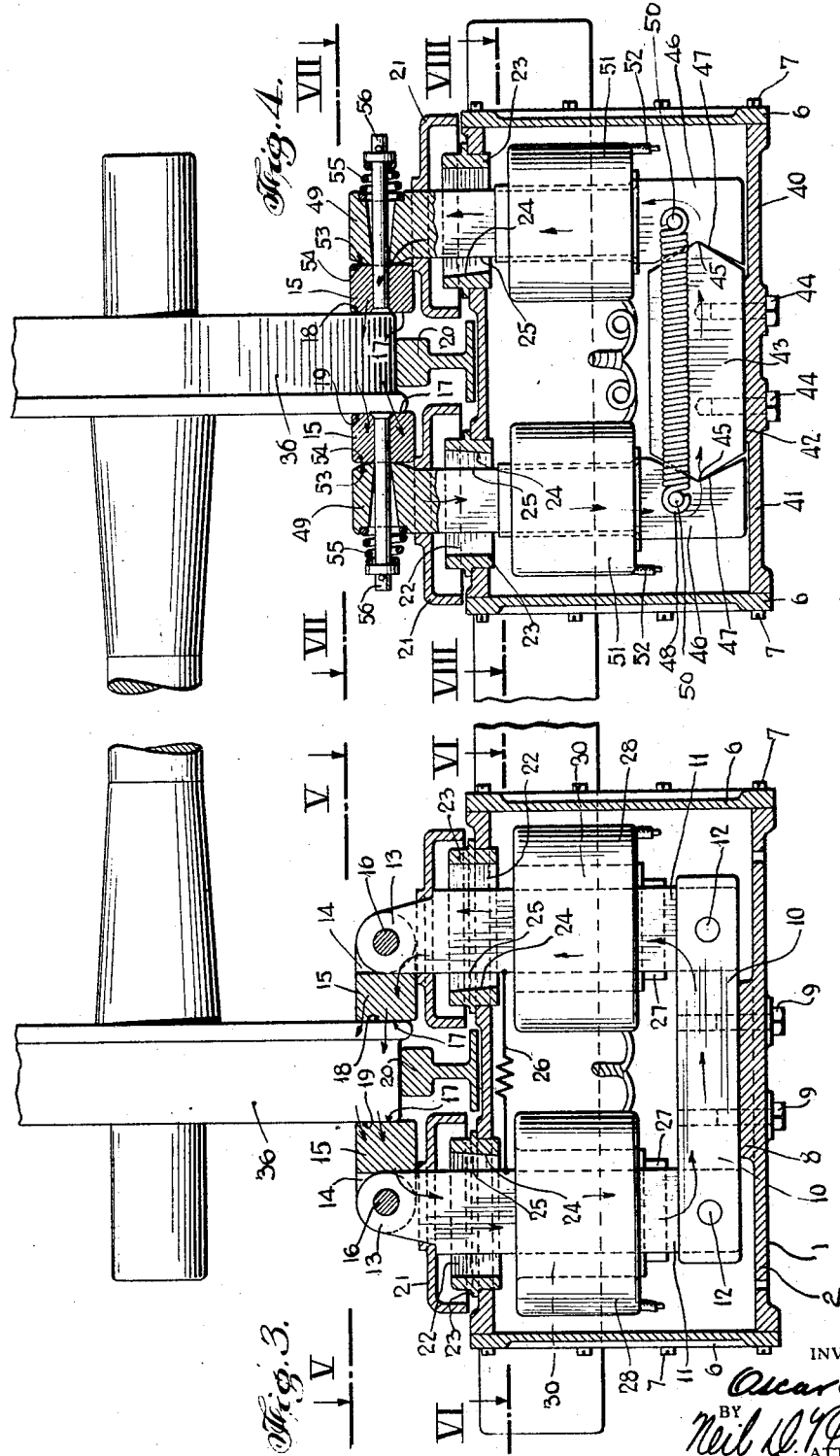

Aug. 11, 1931. O. A. ROSS 1,818,933
MAGNETIC CAR RETARDER
Filed Jan. 7, 1928 3 Sheets-Sheet 3
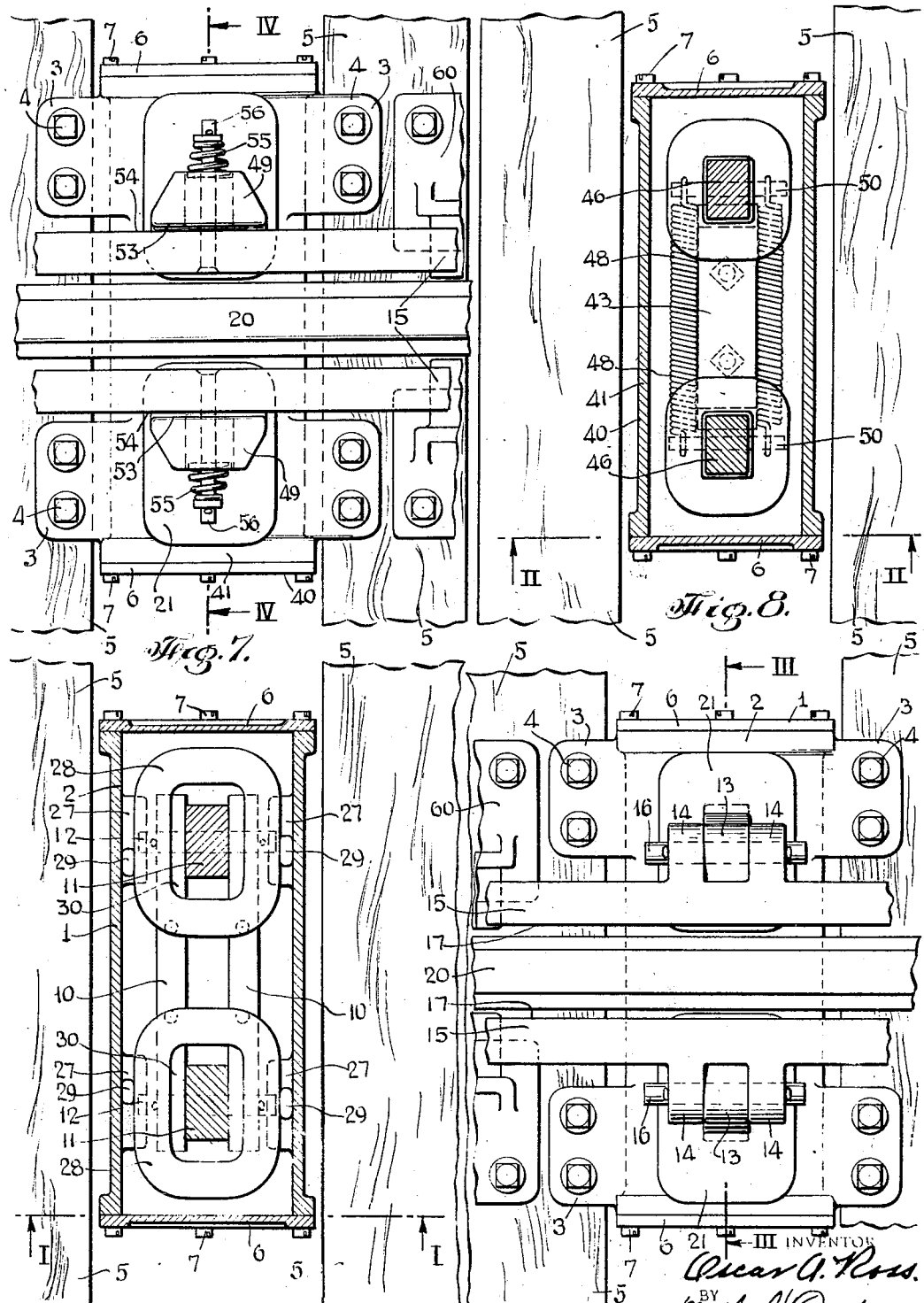

Patented Aug. 11, 1931

1,818,933

UNITED STATES PATENT OFFICE

OSCAR A. ROSS, OF NEW YORK, N. Y., ASSIGNOR TO GENERAL RAILWAY SIGNAL COMPANY, OF ROCHESTER, NEW YORK

MAGNETIC CAR RETARDER

Continuation of application Serial No. 245,141, filed January 7, 1928. This application filed January 7, 1928. Serial No. 245,142.

This invention refers to car retarders and more particularly to the class termed "Magnetic car retarders" as disclosed in my copending application for Letters Patent, Serial No. 245,141, filed January 7, 1928, and of which this application for Letters Patent forms a continuating application.

The prime object of this invention is to produce car retarding mechanism for retarding the movement of freight cars or similar vehicles wherein magnetic flux is employed as the medium, or agent for causing certain track instrumentalities to co-act with certain parts of said cars to effect said retardation.

Another object is to produce magnetic car retarding mechanism for retarding the movement of freight cars, or similar vehicles, wherein the magnetic flux is generated in a path comprising track instrumentalities and is completed by passage of said flux through a path formed by the peripheral section of the car wheels in this manner providing a substantially short "foreign" flux path whereby more efficient magnetic braking may be obtained.

Another object is to produce magnetic car retarding mechanism wherein the magnetic flux is generated in a path comprising track instrumentalities and is completed by passage of said flux from one side of the peripheral section of the car wheels to the other side of said section in this manner providing two frictional surfaces on each wheel whereby more effective braking is obtained then if only one surface were employed.

Another object is to produce a mechanism of the kind hereintofore described wherein a minimum number of movable parts are exposed to the elements, and whereby for continuous operation of said mechanism, a minimum of manual labor will be required for the removal of snow, sleet or ice if present.

Another object is to furnish a mechanism of the kind hereintofore described wherein the housing for said mechanism may be made of ferric material, however by novel arrangement of the structure preventing substantial magnetic flux leakage when and as said flux is rendered effective to cause magnetic braking.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of the instrument wherein patentable novelty is claimed for certain and peculiar features of the invention, it being understood that, within the scope of what hereinafter thus is claimed, divers changes in the form, proportions, size and minor details of the device and system of control therefore may be made without departing from the spirit of, or sacrificing any of the details of the invention.

In describing the invention in detail, reference is had to the accompanying drawings wherein I have illustrated embodiments of my invention, and wherein like characters of reference designate corresponding parts throughout the several views, and in which:—

Fig. 1 is a side elevation of one form of an electromagnetic track brake embodying my invention taken on the line I—I of Fig. 6 of the drawings, as viewed in the direction of the arrows;

Fig. 2 is a similar view of a modified form of my invention taken on the line II—II of Fig. 8 of the drawings, as viewed in the direction of the arrows;

Fig. 3 is a vertical section of the electromagnetic track brake shown in Fig. 1 taken on the line III—III of Fig. 5, as viewed in the direction of the arrows;

Fig. 4 is a vertical section of the electromagnetic track brake shown in Fig. 2 taken on a line IV—IV of Fig. 7, as viewed in the direction of the arrows;

Fig. 5 is a plan view of the electro-magnetic track brake shown in Fig. 1 taken on a line V—V of Fig. 3, as viewed in the direction of the arrows;

Fig. 6 is a horizontal cross-sectional view of the electro-magnetic track brake shown in Fig. 1 looking downwardly and taken on the line VI—VI of Fig. 3, as viewed in the direction of the arrows;

Fig. 7 is a plan view of the electro-magnetic track brake shown in Fig. 2 taken on the line VII—VII of Fig. 4, as viewed in the direction of the arrows; and Fig. 8 is a horizontal cross-sectional view of the electro-magnetic track brake shown in Fig. 2 looking downwardly and taken on the line VIII—VIII of Fig. 4, as viewed in the direction of the arrows.

Referring to Figs. 1, 3, 5 and 6, the magnetism generating unit 1, hereinafter termed magnetic braking unit, comprises housing 2, having supporting lugs 3—3 secured to ties 5—5 by bolts or lags 4—4, and cover plates 6—6 secured by bolts 7—7.

Secured to bosses 8—8 of said housing, by bolts 9—9 are magnetic yoke members 10—10 supporting hinged cores 11—11 by pins 12—12, the upper ends 13—13 of said cores being hinged to lugs 14—14 forming part of friction braking bars 15—15, by pins 16—16; the friction faces 17—17 of said bars are adapted to frictionally contact with inner face 18 and outer face 19 of wheel 36 forming part of a car axle of known structure adapted to travel on rails, as 20 suitably secured to ties 5—5. Also supported by the upper ends 13—13 of cores 11—11 are shields 21—21, preferably of non-ferric material acting to prevent foreign matter from entering orifice 22—22 in bushings 23—23 also preferably of non-ferric material and which are suitably secured to housings 2—2. Said bushings have a stop face 24 adapted to act as a stop for face 25 of core 11 when wheels, as 36 are not present between friction bars 15—15. Said bars are preferably normally restrained toward each other by a spring, as 26 interposed between cores 11—11, and, as surfaces 24 and 25 contact with each other said bars will approximate but not engage the sides of rail 20.

Supported by lugs 27—27 forming part of housing 2, are magnet coils 28—28, said coils being secured against movement by suitable wedges, as 29—29, the cores 11—11 being adapted to have movement in the openings 30—30 of said coils but not contacting with the sides thereof.

Referring to the modified magnetic braking unit 40 shown in Figs. 2, 4, 7 and 8, the housing 41 is similar to housing 2 except that lugs 27—27 are omitted and bosses 8—8 are modified to form one boss 42 secured to which, by bolts 44—44, is magnetic yoke 43 having knife edges 45—45 supporting cores 46—46 in their V recesses 47—47, springs 48—48 interposed between pins 50—50 acting to cause said knife edges to impinge in said recesses and also restrain the T ends 49—49 of said cores toward each other.

Wound on and rigidly secured to cores 46—46 are magnet coils 51—51 adapted to be moved therewith said coils having suitable flexible terminal wires, as 52—52 through which energy is supplied to said coils as will be more fully hereinafter described.

The upper ends 49—49 of cores 46—46 are T shaped and have cylindrical faces, 53—53 adapted to impinge on rear faces 54—54 of friction bars 15—15, springs 55—55 interposed between said T heads 49—49 and pins 56—56 secured to said bars, acting to restrain said cylindrical faces against said rear faces 54—54.

Magnet cores 46—46 have rigidly secured thereto suitable shields as 21—21 and the face 25 thereof is adapted to be restrained against stop face 24 of bushing 23 when no wheel as 30 is present on rail 20.

Referring again to Figs. 1, 3, 6 and 7 the operation is as follows:—magnetizing current is supplied to magnet coils 28—28 preferably in a manner as disclosed in my co-pending application for Letters Patent Serial No. 245,141 filed January 7, 1928, and, as said coils are energized, and assuming that a wheel as 36 is present on rail 20, a magnetic flux is generated in known manner in a path as shown by the arrows (see Fig. 3) and which comprises the following structure, magnetic yokes 10—10, right hand core 11, core extension 13, lugs 14—14, and pin 16 to right hand friction bar 15, thence from face 17 of said bar to inner face 18 of wheel 30, thence through the peripheral section of said wheel to the outer face 19 thereof, thence to face 17 of left hand bar 15 and through said bar, lugs 14—14 and pin 16 to the extension 13 of left hand core 11, thence through said core returning to magnetic yokes 10—10. It will be noted from the foregoing description that a complete ferric magnetic circuit including a portion of wheel 36, and without an air gap has been formed, thereby producing a comparatively large magnetic flux in said path, in this manner causing the friction faces 17—17 of friction bars 15—15 to adhere to the inner and outer faces 18 and 19, of wheel 36, and as said wheel revolves on rail 20 said friction faces are rubbed against each other whereby a braking effect is produced tending to retard said wheel rotation, said braking effect being largely proportional to the amount of flux present in said path and the number of similar paths employed to establish said retardation effect, and, as more fully described in the aforesaid co-pending application for Letters Patent.

Referring to Figs. 2, 4, 7 and 8 the operation of magnetic braking units 40—40 is similar to that described in connection with Figs. 1, 3, 5 and 6. However coils 51—51 are mobile and in place of employing hinge pins as 12, and 16, as partial conductors of the flux said flux is conducted through so called knife edges 45—47 and 53—54.

Friction bars 15—15 are guided by suitable steering plates, as 60—60, more fully described in the aforesaid co-pending application for Letters Patent, and are also supplied with divergent ends as 61—61 for more ready entrance of wheels, as 30 between said bars.

It is to be understood that friction braking bars 15—15 may be made of considerable length and that a number of magnetic braking units as 1 employed in connection therewith to form a car retarding zone, and as more fully disclosed in the aforesaid copending application for Letters Patent.

Whereas, and when the electric circuit to coils 28—28 is opened a considerable residual magnetic flux obtains, the continued rotation of the one or more wheels, as 36, causes a dispersion of said flux and therefore the magnetic braking ceases substantially simultaneously with the opening of said electric circuit.

Whereas the magnetic flux has been shown as flowing in one direction, or circuitous path, a reversal of polarity of the energizing electric circuit may cause said flux to flow in the opposite direction, and thereby cause equally effective braking.

It is to be noted that the friction brake bars 15—15 are arranged in a plane above that of rail 20, in this manner permitting the friction faces 17—17 of said bar to engage a larger area of the friction faces 18 and 19 of wheel 36 than if said bar were arranged in a plane not higher than the top of said rail.

What I claim is:—

1. A car retarder of the electromagnetic type comprising, a track rail, a car having a wheel of magnetizable material movable over said track rail, a vertically disposed member of magnetic material on each side of said rail each pivotally secured at the bottom end and having a brake shoe at the other end engageable by said car wheel and each brake shoe facing the brake shoe of the other member, a coil on each of said members fixedly secured thereto, separate spring means for urging said brake shoes toward each other and means for electrically energizing said coils.

2. A car retarder of the electromagnetic type comprising, a track rail, a car having a wheel of magnetizable material movable over said track rail, a vertically disposed member of magnetic material on each side of said rail each having a brake shoe engageable by said car wheel and each brake shoe facing the brake shoe of the other member, means for creating magnetic flux in the magnetic circuit formed by said members and brake shoes and including a coil on each of said members, a casing of non-magnetic material for housing said coils and having openings in the upper wall thereof through which said members extend, and hoods surrounding the projecting ends of said members to form a moisture tight connection therewith protecting said openings against the ingress of moisture.

3. A car retarder of the electromagnetic type comprising, a track rail, a car having a wheel of magnetizable material movable over said track rail, a vertically disposed member of magnetic material on each side of said rail each having a brake shoe engageable by said car wheel and each brake shoe facing the brake shoe of the other member, a coil surrounding each of said members, means for electrically energizing said coils, and other means for urging said members toward each other.

4. A car retarder of the electromagnetic type comprising, a track rail, a car having a wheel of magnetizable material movable over said track rail, a vertically disposed member of magnetic material on each side of said rail each having a brake shoe pivotally secured thereto and engageable by said car wheel and each brake shoe facing the brake shoe of the other member, means for creating magnetic flux in the magnetic circuit formed by said members and brake shoes and including a coil on each of said members, a casing of non-magnetic material for housing said coils and having openings in the upper wall thereof through which said members extend, and hoods surrounding the projecting ends of said members to form a moisture tight connection therewith protecting said openings against the ingress of moisture.

5. A car retarder of the electromagnetic type comprising, a track rail, a car having a wheel of magnetizable material movable over said track rail, a vertically disposed member of magnetic material on each side of said rail, a brake shoe pivotally secured to the top of each member for engaging the side of such car wheels, each brake shoe facing the brake shoe of the other member, a coil surrounding each of said members, means for electrically energizing said coils, and other means for urging said members toward each other.

Signed at New York city, in the county of New York, and State of New York, this fifteenth day of December, A. D. 1927.

OSCAR A. ROSS.